(12) United States Patent
Yeh (10) Patent No.: US 6,216,994 B1
(45) Date of Patent: Apr. 17, 2001

(54) SLIDABLE SEAT WITH BRAKE DEVICE

(75) Inventor: Morgen Yeh, Taipei Hsien (TW)

(73) Assignee: Jurapolly Industry Inc., Taipei Hsien (TW)

( * ) Notice: Subject to any disclaimer, the term of this patent is extended or adjusted under 35 U.S.C. 154(b) by 0 days.

(21) Appl. No.: 09/391,478

(22) Filed: Sep. 8, 1999

(51) Int. Cl.$^7$ ...................................................... A47B 1/10
(52) U.S. Cl. .................. 248/346.06; 248/346.04
(58) Field of Search .................. 248/346.04, 346.06, 248/346.07, 319, 129; 188/5

(56) References Cited

U.S. PATENT DOCUMENTS

| | | | |
|---|---|---|---|
| 4,073,369 | * | 2/1978 | Nordskog ................................. 188/5 |
| 4,886,286 | * | 12/1989 | Whorton, III ..................... 280/47.35 |
| 5,323,879 | * | 6/1994 | Poulin .................................... 188/19 |
| 5,472,219 | * | 12/1995 | Eckstrum ............................ 280/32.6 |
| 5,713,586 | * | 2/1998 | Haller ............................... 280/87.051 |
| 5,950,262 | * | 9/1999 | Smoler et al. ............................ 5/613 |

* cited by examiner

Primary Examiner—Daniel P. Stodola
Assistant Examiner—Curtis A. Cohen
(74) Attorney, Agent, or Firm—Rosenberg, Klein & Lee (57) ABSTRACT

A slidable seat with brake device, including: a base seat having a board section, multiple sliding members being mounted on the bottom side of the board section for sliding over a desk face, the bottom end of the board section being formed with a chamber; a brake member fitted in the chamber of the bottom end of the base seat, the bottom end of the brake member being connected with a brake block; and a linking device disposed between the base seat and the brake member. In normal state, the linking device downward resiliently presses the brake member to make the brake block tightly attach to the desk face and prevent the base seat from freely sliding. The linking device is operable to lift the brake member, whereby the brake block no more tightly attaches to the desk face and the base seat can be freely slided and displaced over the desk face by the sliding members so as to shift an article supported on the board section of the base seat, such as a display.

1 Claim, 8 Drawing Sheets

SLIDABLE SEAT WITH BRAKE DEVICE

BACKGROUND OF THE INVENTION

The present invention relates to a slidable seat with brake device, and more particularly to a slidable seat including a base seat and a brake member disposed at bottom end of the base seat. In normal state, the brake member is pressed against a desk face to prevent the base seat from freely sliding. A linking device is operable to lift the brake member and make the brake member leave the desk face. At this time, an article such as a display supported on the base seat can be freely slided and displaced on the desk face along with the base seat.

The picture tube-type display applied to a computer in early time has large volume and heavy weight. Such display has been replaced by plasma or liquid crystal display which has light weight and small volume. In general, a user often positions the display on a corner of a desk to reduce the room occupied by the display. However, when such positioned, in use of the computer, the user must see the display obliquely. This fails to meet the human configuration. Therefore, when using a light and small plasma or liquid crystal display, some users will move the display to the center of the desk face for facilitating use. However, each time using the display, the user must move and displace the display. This is quite inconvenient to the user.

SUMMARY OF THE INVENTION

It is therefore a primary object of the present invention to provide a slidable seat with brake device. The slidable seat includes a base seat slidable over a plane face such a desk face. A brake device is additionally disposed at bottom end of the base seat. When it is desired to move the slidable seat, the user can make the brake device leave the plane face. At this time, the slidable seat can be freely pushed or pulled to slide over the plane face. After the slidable seat is moved to a desired position, the brake device is tightly pressed against the plane face so as to stably locate the slidable seat at the desired position.

According to the above object, the slidable seat with brake device of the present invention includes: a base seat including a board section, multiple sliding members being mounted on the bottom side of the board section for sliding over a desk face, the bottom end of the board section being formed with a chamber; a brake member including a main body snugly disposed in the chamber of the bottom end of the base seat, the bottom end of the main body being connected with a brake block; and a linking device including an operating member disposed between the base seat and the brake member, in normal state, the operating member downward pressing the brake member to make the brake block tightly attach to the desk face and prevent the base seat from freely sliding, the operating member being operable to lift the brake member, whereby the brake block no more tightly attaches to the desk face and the base seat can be freely slided and displaced over the desk face by means of the sliding members so as to shift an article such as a display supported on the board section of the base seat.

In the slidable seat with brake device of the present invention, the linking device includes an operating member. A middle section of the operating member is pivotally mounted on the base seat. A first end of the operating member is pivotally connected with an upper face of the main body of the brake member. A spring in normal state is compressed between a second end of the operating member and the base seat for urging the first end to resiliently downward push the brake member to make the brake block on bottom end thereof tightly attach to the desk face and prevent the base seat from sliding thereover.

In the slidable seat with brake device of the present invention, the brake member is fitted in the chamber of the base seat and hooked by at least one restricting hook arm extending from the base seat so that the brake member is stopped from slipping outward. The linking device includes an operating member slidably positioned in a slide cavity of the base seat. A lateral wall of the operating member is formed with at least one oblique recess in which a projecting shaft disposed on lateral wall of the brake member is slidably fitted for drivingly lifting the brake member. A handle section upward projects from the front end of the operating member. A compression spring is compressed between the chamber and the brake member. In normal state, the compression spring downward resiliently presses the brake member to make the brake block on the bottom end thereof tightly attach to the desk face and prevent the base seat from sliding over the desk face. A restoring spring is compressed between the slide cavity of the base seat and an inner side of the operating member. In normal state, the restoring spring backward resiliently pushes the operating member to make the oblique recesses not upward drive the projecting shaft of the brake member, that is, not lift the brake member so that the brake block will still tightly attach to the desk face to prevent the base seat from sliding.

The present invention can be best understood through the following description and accompanying drawings wherein:

DETAILED DESCRIPTION OF THE PREFERRED EMBODIMENTS

Please refer to FIGS. 1 to 8. The slidable seat with brake device of the present invention includes: a base seat 1, multiple sliding members 12 being mounted at the bottom of the base seat 1 for sliding over a desk face T; a brake member 2 slidably fitted in the bottom of the base seat 1, a brake block 22 being connected with the bottom end of the brake member 2; and a linking device 3 disposed between the base seat 1 and the brake member 2. In normal state, the linking device 3 depresses the brake member 2, making the brake block 22 at the bottom end thereof tightly attach to the desk face T for preventing the base seat 1 from freely sliding. The linking device 3 can lift the brake member 2 and no more press the brake block 22 against the desk face T. At this time, the display M supported on the base seat 1 can be slided over the desk face T along with the sliding members 12 of the base seat 1.

Figure 1:
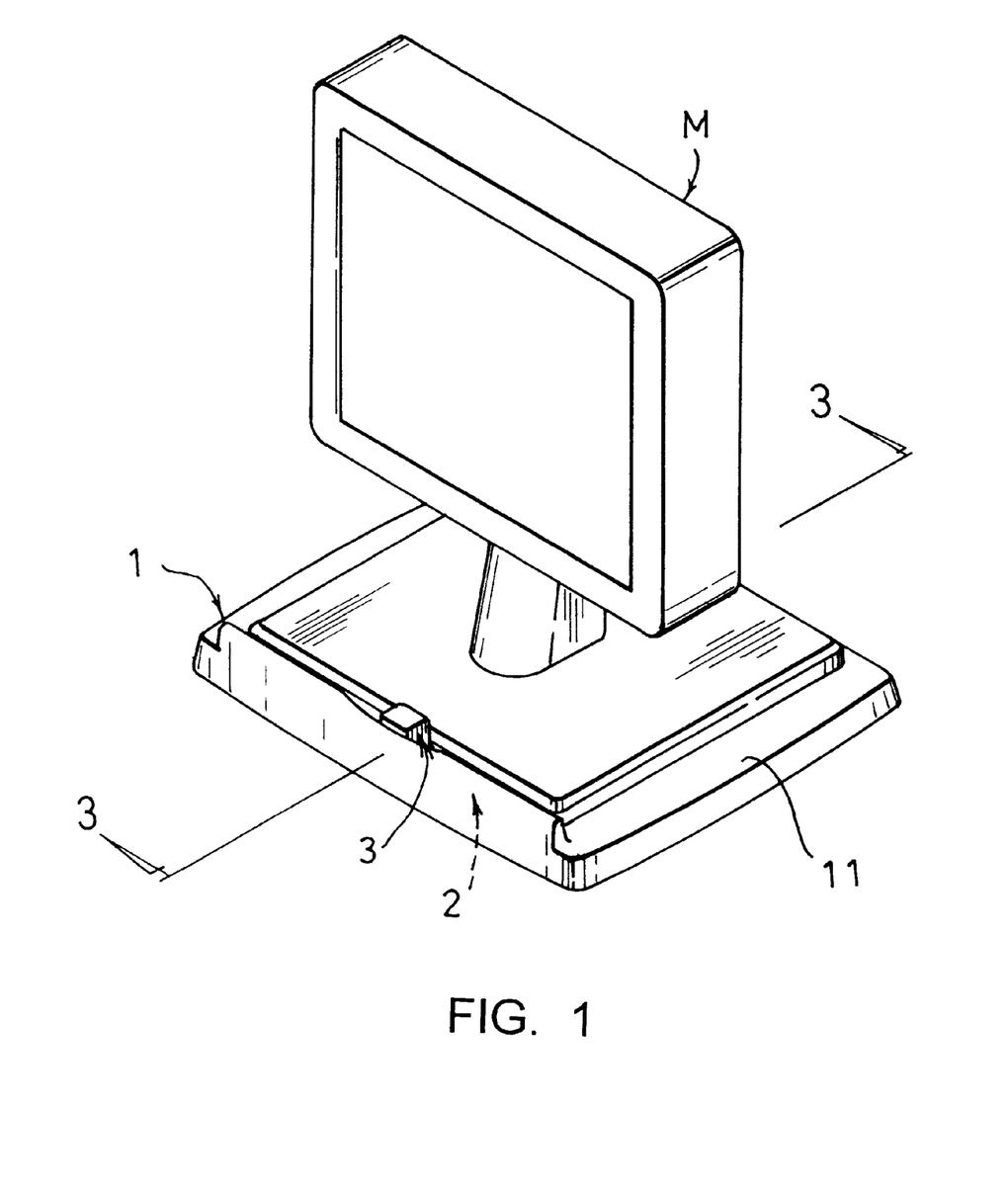
FIG. 1 is a perspective view showing the application of a first embodiment of the present invention to a display.
Figure 2:
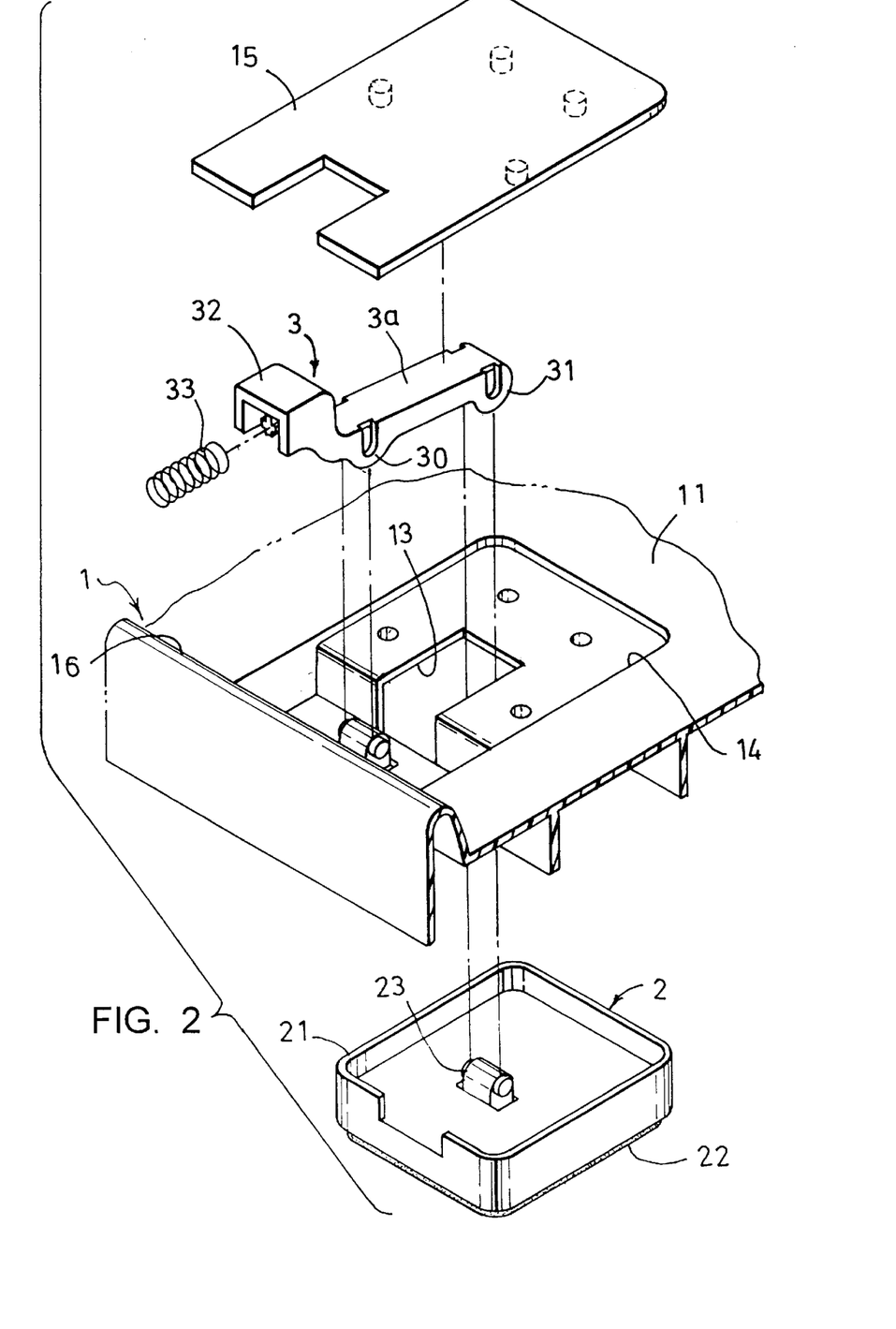
FIG. 2 is a partially perspective exploded view of the first embodiment of the slidable seat of the present invention.
Figure 3:
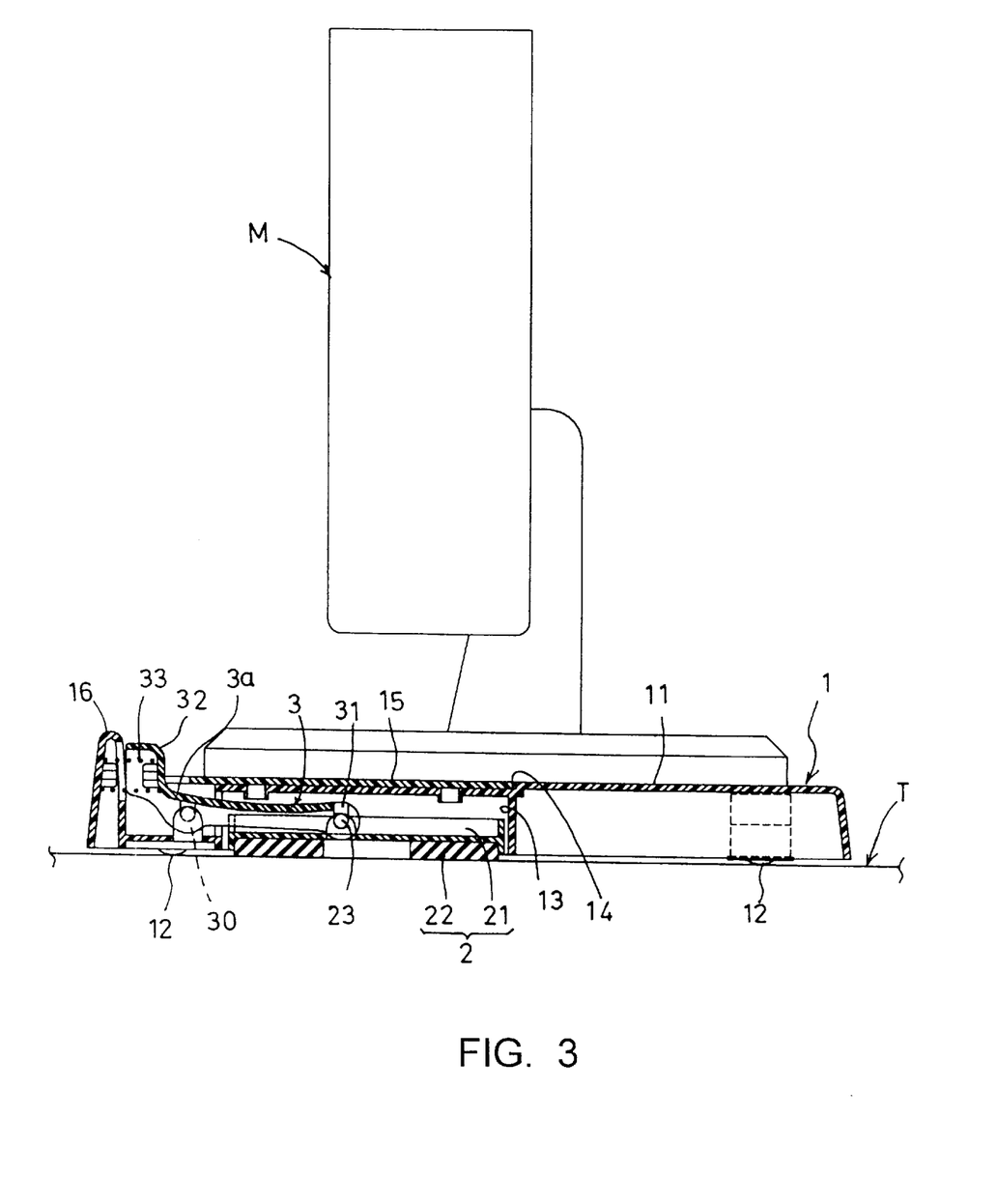
FIG. 3 is a sectional view taken along line 3—3 of FIG. 1.

Referring to FIGS. 1, 2 and 3, the base seat 1 includes a board section 11 on which the display M such as plasma, liquid crystal display, etc. is mounted. Multiple sliding members 12 are mounted on the bottom side of the board section 11. The bottom end of the board section 11 is formed with a chamber 13 in which the brake member 2 is fitted. The upper face of the board section 11 is formed with a dent 14 in which a cover board 15 is snugly inserted for enclosing the linking device 3. The cover board 15 is flush with the board section 11 to form a plane surface. The front end of the board section 11 is formed with an upward projecting section 16 for a user to exert a force thereto to operate the linking device 3.

Figure 5:
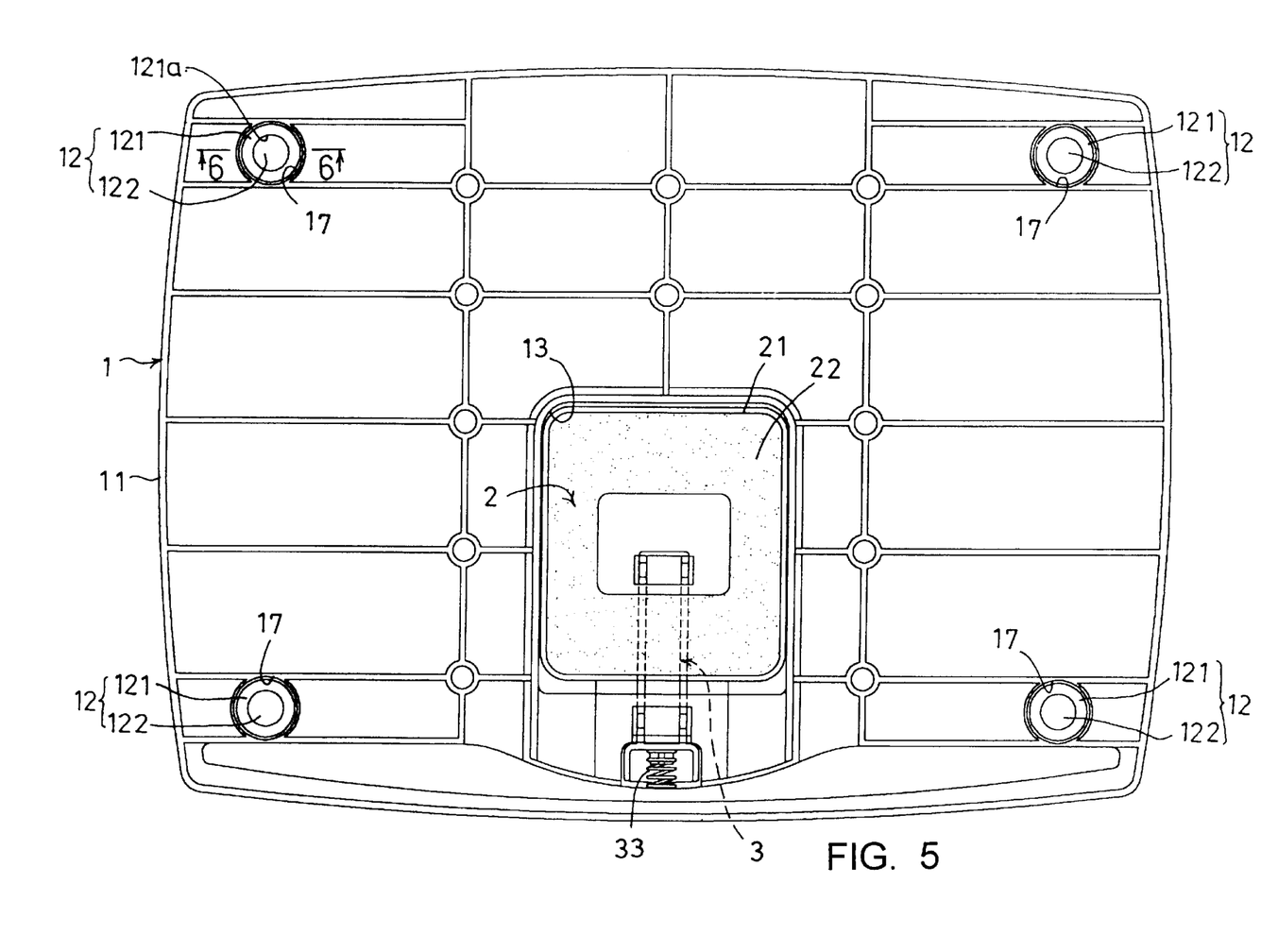
FIG. 5 is a bottom view of the present invention.
Figure 6:
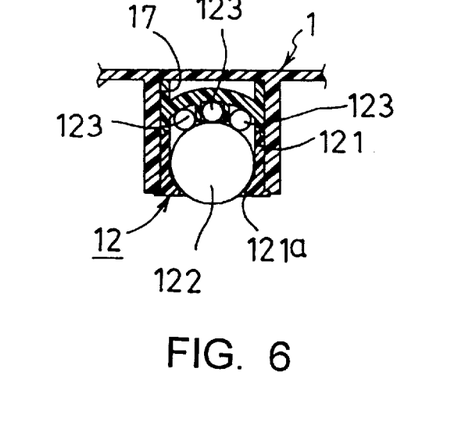
FIG. 6 is a sectional view taken along line 6—6 of FIG. 5.
Figure 7:
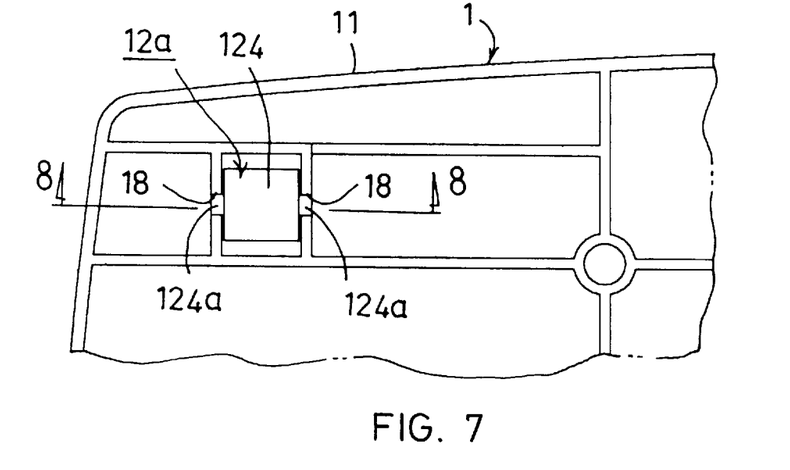
FIG. 7 is a bottom view of a part of another embodiment of the sliding member of the present invention.
Figure 8:
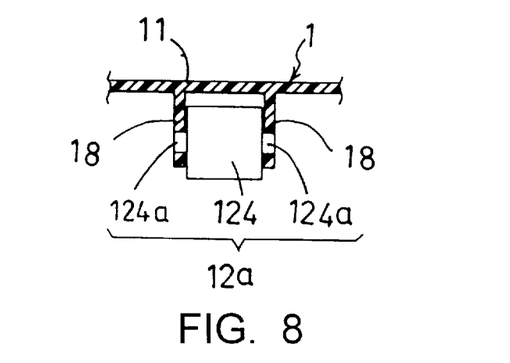
FIG. 8 is a sectional view taken along line 8—8 of FIG. 7.

Referring to FIGS. 5 and 6, the sliding member 12 of the present invention includes: a sleeve 121 inserted in the insertion cavity 17 of bottom end of the board section 11; a rolling ball 122 stably fitted with the bottom end of the sleeve 121, a bottom end of the rolling ball 122 protruding out of the bottom opening 121a of the sleeve 121; and multiple small rolling balls 123 positioned between the sleeve 121 and the rolling ball 122, enabling the rolling ball 122 to freely roll and rotate, so that the base seat 1 can be slided and displaced in any direction. Alternatively, as shown in FIGS. 7 and 8, the sliding member 12a can include a roller 124 having two pivot shafts 124a on two sides. The pivot shafts 124a are fitted into a pair of pivot seats 18 of the bottom end of the board section 11, whereby the base seat 1 can be slided and displaced over the desk face T via the rollers 124.

Referring to FIGS. 2 and 3, the brake member 2 includes a main body 21 snugly disposed in the chamber 13 of the bottom end of the base seat 1. The bottom end of the main body 21 is connected with a brake block 22 with high frictional coefficient. The top end of the main body 21 is disposed with a pivot section 23 for pivotally connecting with a first end 31 of an operating member 3a of the linking device 3.

Figure 4:
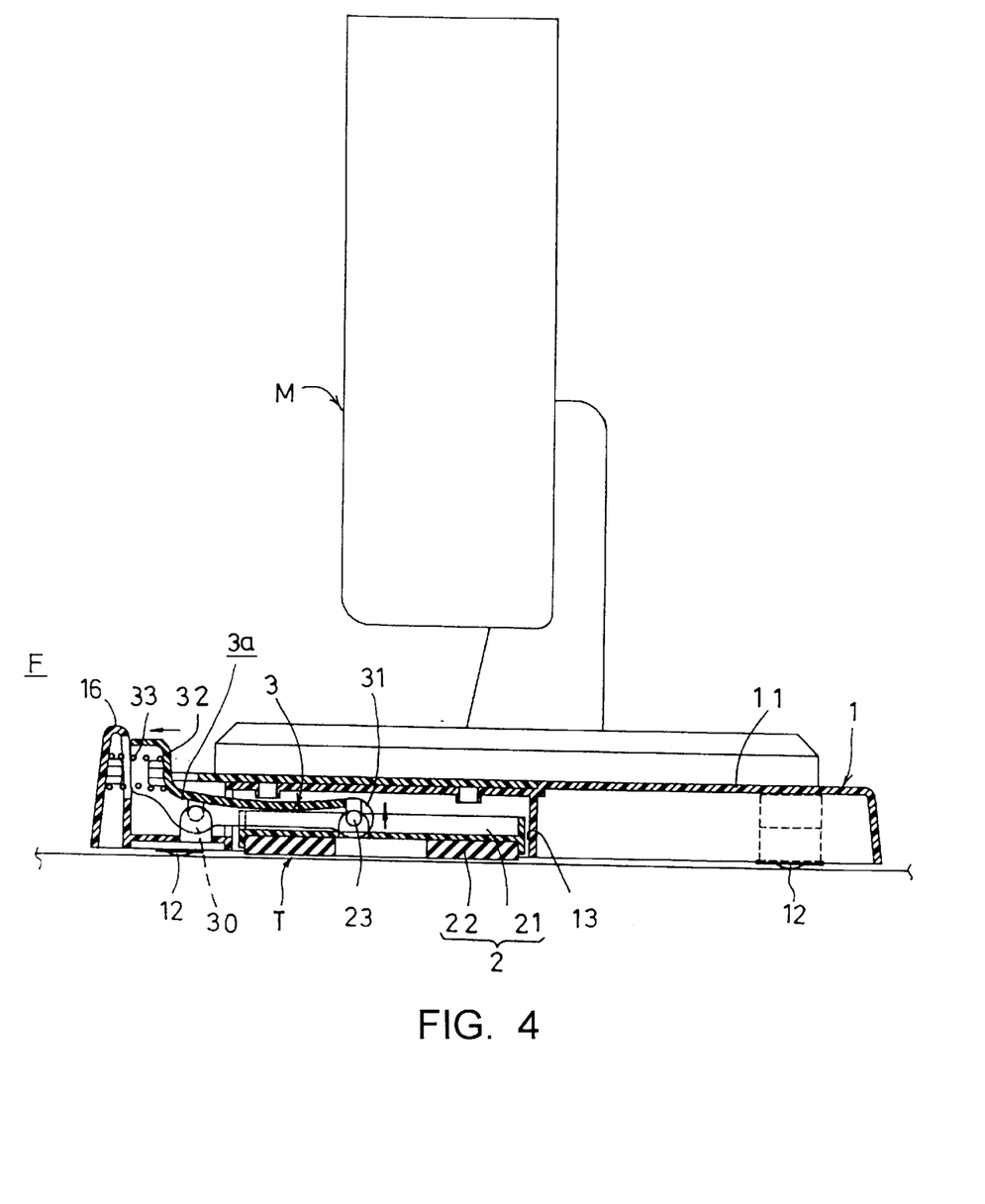
FIG. 4 is a view according to FIG. 3, showing that the brake block is lifted.

As shown in FIGS. 2 and 3, the linking device 3 includes an operating member 3a. A middle section 30 of the operating member 3a is pivotally mounted on the base seat 1. The first end 31 of the operating member 3a is pivotally connected with the main body 21 of the brake member 2. A spring 33 in normal state is compressed between a second end 32 of the operating member 3a and the base seat 1 for urging the first end 31 to resiliently downward push the brake member 2 to make the brake block 22 tightly attach to the desk face T and prevent the base seat 1 from sliding thereover. As shown in FIG. 4, when it is desired to slide the base seat 1, a user only needs to bias the second end 32 of the operating member 3a toward the front side F of the base seat 1 so as to lift the first end 31 thereof. At this time, the brake block 22 of the brake member 2 is driven and moved upward to no more attach to the desk face T. Under such circumstance, by means of the sliding members 12, the base seat 1 can be freely slided and displaced over the desk face T. After the base seat 1 is moved to a desired position, the operating member 3a is released. At this time, the spring 33 is resiliently restored to drive the first end 31 of the operating member 3a to downward press the brake member 2 and make the brake block 22 tightly attach to the desk face T. Under such circumstance, the base seat 1 is stably located on the desk face T.

Figure 9:
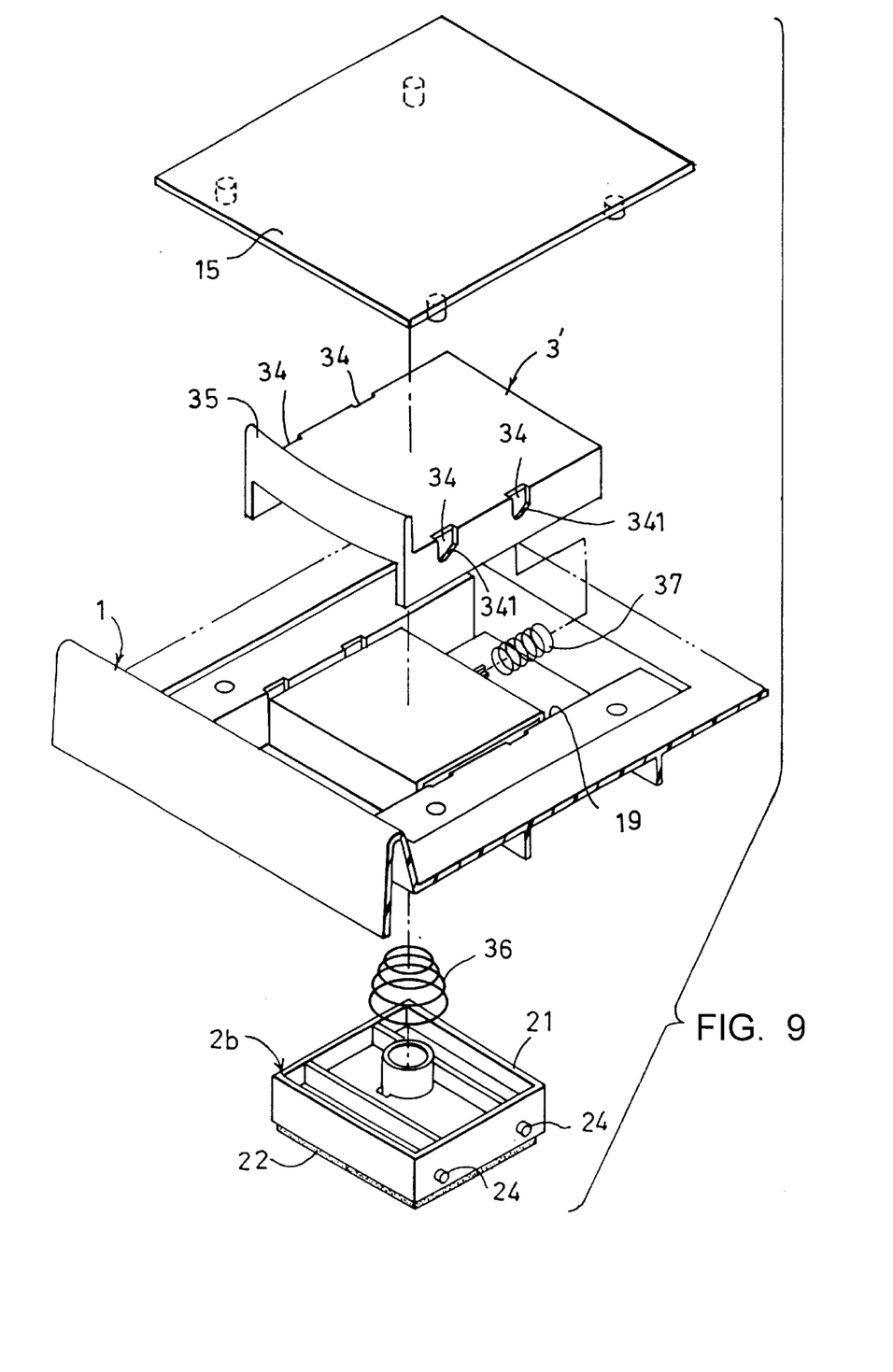
FIG. 9 is a perspective exploded view of a second embodiment of the slidable seat of the present invention.
Figure 10:
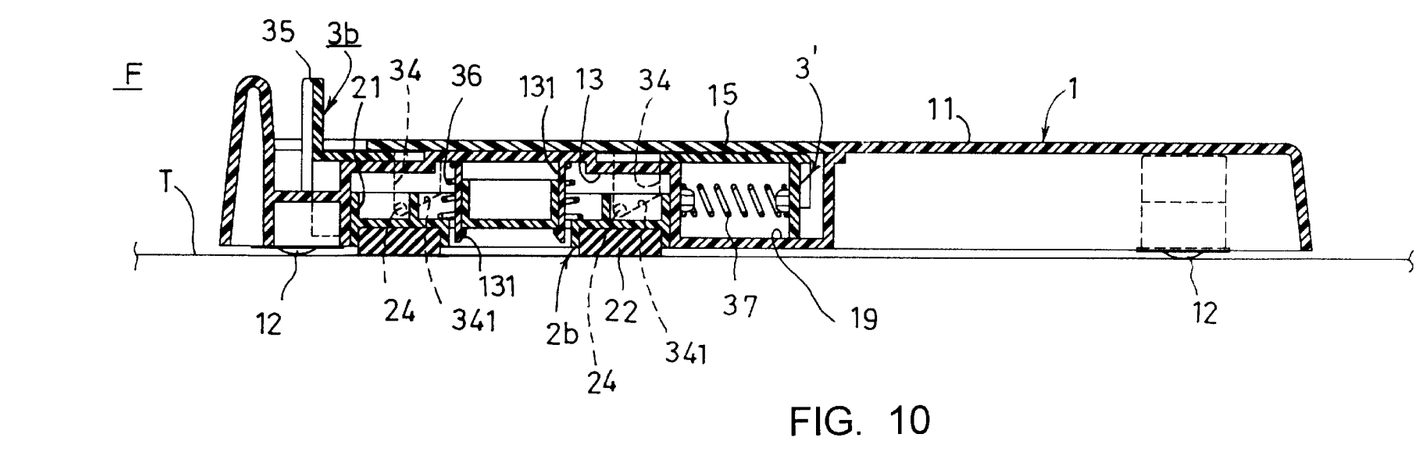
FIG. 10 is a sectional of the second embodiment of the present invention.
Figure 11:
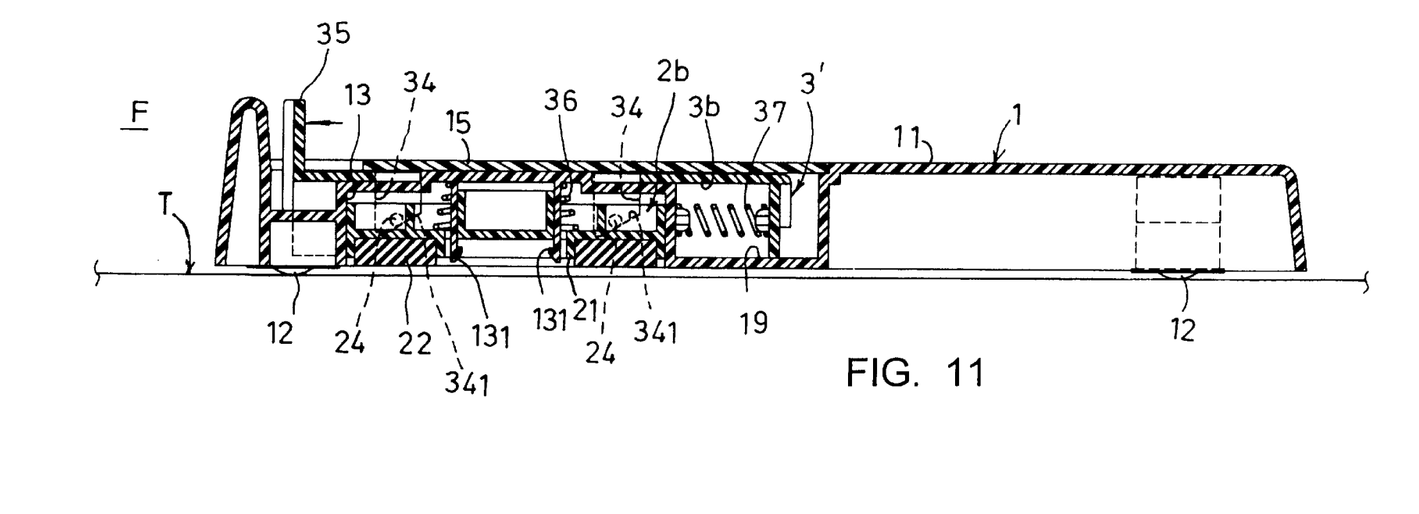
FIG. 11 is a view according to FIG. 10, showing that the brake block is lifted.

FIGS. 9, 10 and 11 show a modification of the slidable seat of the present invention. The brake member 2b is fitted in the chamber 13 of the base seat 1 and hooked by at least one restricting hook arm 131 extending from the base seat 1, so that the brake member 2b is stopped from slipping outward. The linking device 3' includes an operating member 3b slidably positioned in a slide cavity 19 of the base seat 1. A lateral wall of the operating member 3b is formed with at least one oblique recess 34 in which a projecting shaft 24 disposed on lateral wall of the brake member 2b is slidably fitted for drivingly lifting the brake member 2b. A handle section 35 upward projects from the front end of the operating member 3b. A compression spring 36 is compressed between the chamber 13 and the brake member 2b. In normal state, the compression spring 36 downward resiliently presses the brake member 2b to make the brake block 22 tightly attach to the desk face T and prevent the base seat 1 from sliding over the desk face T. A restoring spring 37 is compressed between the slide cavity 19 of the base seat 1 and an inner side of the operating member 3b. In normal state, the restoring spring 37 backward resiliently pushes the operating member 3b to make the oblique recesses 34 not upward drive the projecting shaft 24 of the brake member 2b, that is, not lift the brake member 2b. Therefore, the brake block 22 will still tightly attach to the desk face T to prevent the base seat 1 from sliding. As shown in FIG. 11, when it is desired to slide the base seat 1, a user only needs to shift the handle section 35 of the operating member 3b toward the front side F of the base seat 1. At this time, the oblique side 341 of the bottom end of each oblique recess 34 lifts the projecting shaft 24 of the brake member 2b, that is, lifts the brake member 2b so as to make the brake member 22 leave the desk face T and no more brake the base seat 1. Under such circumstance, the base seat 1 can be freely slided over the desk face T. After the base seat 1 is moved to a desired location, the operating member 3b is released. At this time, the compression spring 36 and the restoring spring 37 are respectively restored to again make the brake block 22 of the brake member 2b tightly attach to the desk face T so as to stably locate the base seat 1 on the desk face T.

By means of the linking device, an article such as a display is supported on the base seat of the slidable seat with brake device of the present invention and can be freely slided over a desk face and stably located. Therefore, the article can be conveniently and quickly moved to any position of the desk face as necessary.

The above embodiments are only used to illustrate the present invention, not intended to limit the scope thereof. Many modifications of the above embodiments can be made without departing from the spirit of the present invention.

What is claimed is:

1. A slidable seat with brake device, comprising:
   a base seat including a board section, multiple sliding members being mounted on a bottom side of the board section for sliding over a desk face, the board section having a bottom end formed with a chamber;
   a brake member including a main body snugly disposed in the chamber of the bottom end of the base seat, the bottom end of the main body being connected with a brake block, the brake member being fitted in the chamber of the base seat and hooked by at least one restricting hook arm extending from the base seat, so that the brake member is stopped from slipping outward; and, a linking device including an operating member disposed between the base seat and the brake member, the operating member biasing the brake member downward to make the brake block tightly engage the desk face and prevent the base seat from freely sliding, the operating member being operable to lift the brake member, whereby the brake block disengages from the desk face and the base seat con be freely slid and displaced over the desk face by means of the sliding members so as to shift an article supported in the board section of the base seat, the linking device including (a) an operating member slidably positioned in a slide cavity of the base seat, a lateral wall of the operating member being formed with at least one oblique recess in which a projecting shaft disposed on a lateral wall of the brake member is slidably fitted for drivingly lifting the brake member, (b) a handle section upward projecting from the front end of the operating member, (c) a compression spring being compressed between the chamber and the brake member, the compression spring resiliently pressing the brake member downward to make the brake block on the bottom end thereof tightly engage the desk face and prevent the base seat from sliding over the desk face, and (d) a restoring spring being compressed between the slide cavity of the base seat and an inner side of the operating member, the restoring spring resiliently pushing the operating member backward to prevent the at least one oblique recess from upwardly driving the projecting shaft of the brake member, thereby preventing lifting of the brake member so that the brake block will maintain tight engagement with the desk face to prevent the base seat from sliding.

* * * * *